(12) United States Patent
Chien et al.

(10) Patent No.: US 7,304,727 B2
(45) Date of Patent: Dec. 4, 2007

(54) LASER DISTANCE-MEASURING DEVICE

(75) Inventors: Pie-Yau Chien, Taichung (TW);
Hua-Tang Liu, Taichung (TW);
Hui-Qing Chen, Hang-zhou (CN);
Shou-Qing Yang, Hang-zhou (CN);
Hai-Hua Chen, Hang-zhou (CN);
Liang Li, Hang-zhou (CN); Han Lu,
Hang-zhou (CN); Peng-Fei Song,
Hang-zhou (CN)

(73) Assignee: Asia Optical Co., Inc., Taichung (TW)

( * ) Notice: Subject to any disclaimer, the term of this patent is extended or adjusted under 35 U.S.C. 154(b) by 47 days.

(21) Appl. No.: 11/289,244

(22) Filed: Nov. 29, 2005

(65) Prior Publication Data
US 2006/0268261 A1 Nov. 30, 2006

(30) Foreign Application Priority Data
May 25, 2005 (TW) .............................. 94117149 A

(51) Int. Cl.
*G01B 11/26* (2006.01)
(52) U.S. Cl. .............................. 356/139.1; 356/139.01
(58) Field of Classification Search . 356/139.01–139.1
See application file for complete search history.

(56) References Cited

U.S. PATENT DOCUMENTS

| 5,291,262 | A | * | 3/1994 | Dunne ....................... 356/5.06 |
| 5,949,531 | A | * | 9/1999 | Ehbets et al. .............. 356/5.01 |
| 6,052,190 | A | * | 4/2000 | Sekowski et al. ........... 356/601 |
| 6,624,881 | B2 | | 9/2003 | Waibel et al. |

OTHER PUBLICATIONS

U.S. Appl. No. 10/318,065, Asia Optical Co., Inc., whole document.

* cited by examiner

*Primary Examiner*—Thomas H. Tarcza
*Assistant Examiner*—Luke D. Ratcliffe

(57) ABSTRACT

A laser distance-measuring device includes a laser-transmitting portion, a laser-receiving portion, a coupling portion, an inclination-measuring portion, a signal-processing portion, and a display. The laser-transmitting portion emits a laser beam, and the laser-receiving portion receives the laser beam. The coupling portion interconnects the laser-receiving portion and the signal-processing portion. The inclination-measuring portion detects an inclination angle of the laser beam. The signal-processing portion processes the signals received from the laser-receiving portion and the inclination-measuring portion and sends the result to the display. The display receives and displays the result of processing by the signal-processing portion.

12 Claims, 5 Drawing Sheets

LASER DISTANCE-MEASURING DEVICE

BACKGROUND OF THE INVENTION

1. Field of the Invention

The present invention relates to a laser distance-measuring device, more particularly, to a laser distance-measuring device capable of easily measuring a horizontal distance.

2. Description of the Related Arts

Laser distance-measuring devices have been widely used in a variety of applications, such as power engineering, hydraulic engineering, architecture, geographic investigation, and athletic ranging, for measuring distance between two stationary objects.

U.S. Pat. No. 6,624,881 describes a conventional laser distance-measuring device. The device comprises a microcontroller, a non-erasable memory, a mass memory, a keypad, a display, a radiation source, and a radiation receiver. The microcontroller controls the radiation source to emit a modulated laser beam. The laser beam is received by the radiation receiver after being reflected by a target object, and is modulated by the microcontroller. The time that the laser beam takes during the journey is recorded, and is multiplied by a propagation velocity of the laser beam to determine the distance that the device is distant from the target object. Data of measurement are stored in the mass memory, and the result is shown on the display. In addition, operation modes and correction algorithms, which are stored in the non-erasable memory, can be selected through the keypad for desired result of measurement.

Although the conventional laser distance-measuring device can measure a straight distance of an object from the device, it has difficulty to measure a distance between two spaced points, which often happens in the fields of architecture and construction. For example, workers usually need to measure the height of a wall, a tree, or a building.

Referring to FIG. 4 of the attached drawings, to measure the height C of for example a building, the conventional laser distance-measuring device detects distances A and B first, and height C is then figured out by Pythagorean theorem. Distance A represents a horizontal distance that is perpendicular to C, and distance B represents a hypotenuse in the right triangle. However, when an obstacle, which blocks the laser beam, is present in the trace of A, it is not possible to measure the distance A and thus it cannot calculate the height C. This happens very often in practical applications, and makes the measurement of height C difficult.

On the other hand, U.S. patent application Ser. No. 10/813,065, filed by the Applicant on Mar. 31, 2004, discloses an inclinometer, which comprises a signal sampling circuit that can be employed in a laser-leveling device. The inclinometer has an output pin, on opposite sides of which a pair of first input pins and a pair of second input pins are symmetrically arranged, and an electrolyte conducting between the first input pins and the output pin, and between the second input pins and the output pin. The signal sampling circuit includes a signal-generating module, a sample-and-hold module, and a difference module. The signal-generating module generates a plurality of level-measuring signals at fixed intervals. The level-measuring signals are applied to the first input pins and the second input pins alternately, thereby outputting a plurality of corresponding first output signals and second output signals in the output pin. The first output signals and the second output signals are sampled and held by the sample-and-hold module, and first sampling signals and the second sampling signals are output. The difference module receives the first sampling signals and the second sampling signals, and determines the difference between the first and second sampling signals. The difference is converted into a level-measuring signal, which is applied to a microcontroller. The microcontroller then works out the current inclination.

Thus, the present invention is aimed to provide a laser distance-measuring device in combination with an inclinometer to enhance the operability and precision of measurement thereof.

BRIEF SUMMARY OF THE INVENTION

An object of the present invention is to provide a laser distance-measuring device, which combines an inclinometer to simplify the measurement operation.

Another object of the present invention is to provide a laser distance-measuring device that incorporates an inclinometer to allow for easy measurement of a height of a target object, a horizontal distance to a vertical wall, and an inclination angle that a measuring laser beam deflects from the horizontal line.

A laser distance-measuring device in accordance with the present invention comprises a laser-transmitting portion that emits a laser beam toward an object, a laser-receiving portion that receives a reflected beam from the object, a coupling portion that connects the laser receiving portion with a signal-processing portion, and an inclination-measuring portion that detects an inclination angle of the laser distance-measuring device with respect to the horizontal. The signal-processing portion receives and processes signals from the laser-receiving portion, the coupling portion, and the inclination-measuring portion and sends the result to a display. The display receives the result and displays it.

To compare with the conventional devices, the merit of the present invention resides on the inclination-measuring portion, which is capable of sensing the inclination signal. With the inclination-measuring portion, the present invention is more convenient in measuring heights and horizontal distances. In addition, the high precise hardware of the device enables high precision measurements.

Other objects, advantages, and novel features of the invention will become more apparent from the following detailed description of a preferred embodiment when taken in conjunction with the accompanying drawings, wherein:

DETAILED DESCRIPTION OF THE PREFERRED EMBODIMENTS

Figure 1:
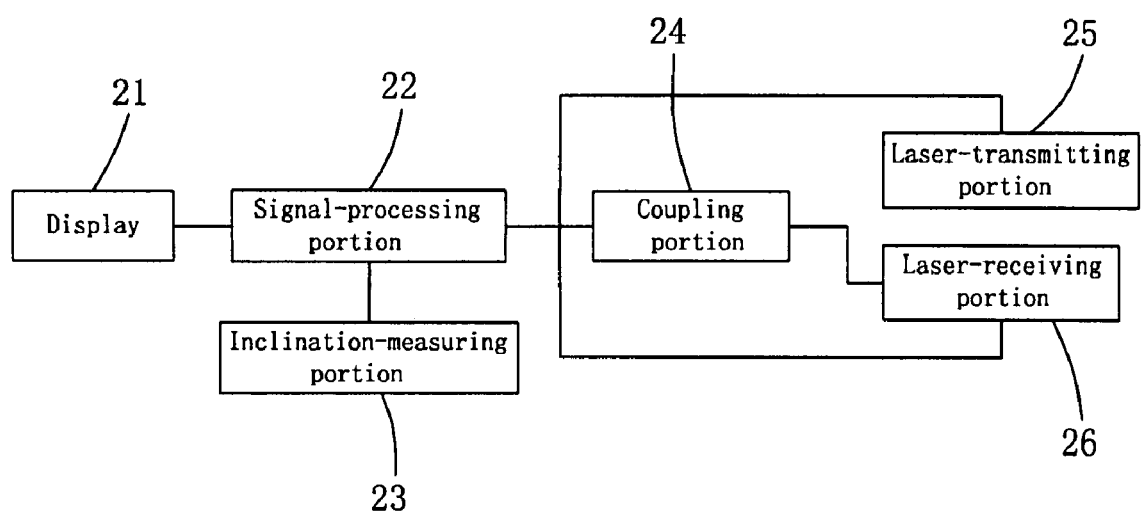
FIG. 1 is a block diagram of a laser distance-measuring device according to the present invention.

With reference to the drawings and in particular to FIG. 1, a laser distance-measuring device constructed in accordance with the present invention comprises a laser-transmitting portion 25, a laser-receiving portion 26, a coupling portion 24, an inclination-measuring portion 23, a signal-processing portion 22, and a display 21.

The laser-transmitting portion 25 connects with the coupling portion 24 and the signal-processing portion 22. The laser-receiving portion 26 also connects with the coupling portion 24 and the signal-processing portion 22. The coupling portion 24, which is connected to both the laser-transmitting portion 25 and the laser-receiving portion 26, is connected to the signal-processing portion 22. The inclination-measuring portion 23 connects with the signal-processing portion 22. The signal-processing portion 22 controls the inclination-measuring portion 23, the coupling portion 24, and the laser-transmitting portion 25, receives signals from the laser-receiving portion 26 and the inclination-measuring portion 23, and processes the received signals. The display 21 connects with the signal-processing portion 22, receives the result of processing performed by the signal-processing portion 22, and displays the processing result.

Figure 2:
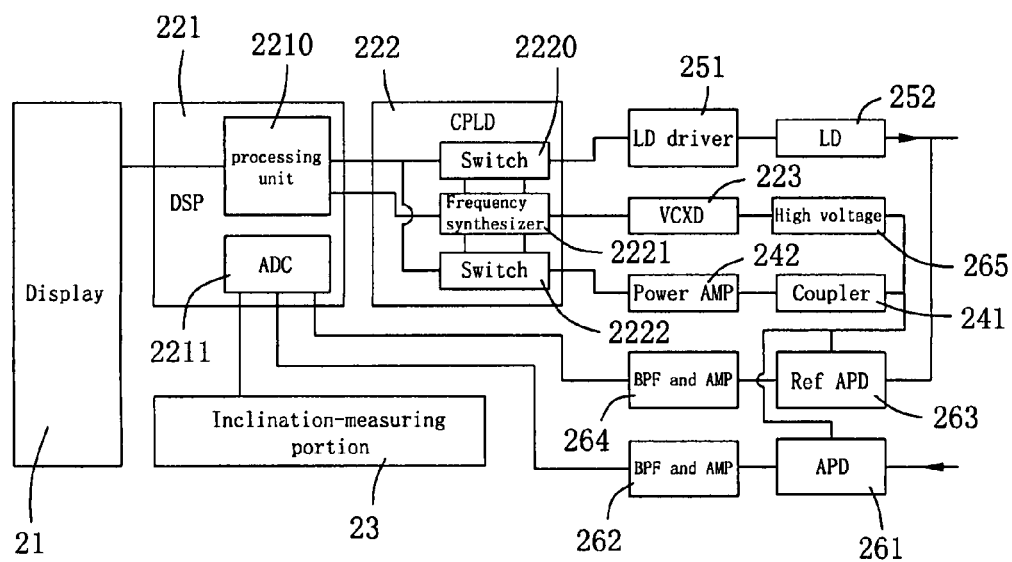
FIG. 2 is a detailed block diagram of the laser distance-measuring device illustrated in FIG. 1.

Also referring to FIG. 2, a detailed block diagram of the laser distance-measuring device is shown. The laser-transmitting portion 25 comprises a laser diode driver (LD driver) 251 and a laser diode (LD) 252. The LD 252 connects to a Complex Programmable Logic Device (CPLD) 222 through the LD driver 251. The CPLD 222 generates an oscillating control signal to control the LD driver 251, and drives the LD 252 to emitting a laser beam.

The laser-receiving portion 26 comprises an avalanche photo diode (APD) 261, a Reference avalanche photo diode (Ref APD) 263, a pair of band-pass filters and amplifiers 262 and 264 and a high voltage 265. The APD 261 and the Ref APD 263 connect to an analog-to-digital converter 2211 that constitutes in part the signal-processing portion 22 through the amplifiers 262 and 264. The APD 261 and the Ref APD 263 receive a laser beam and convert the received light signals into electronic signals. More clearly, the APD 261 receives the laser beam reflected by a target object, and the Ref APD 263 receives the laser beam directly from the LD 252. The band-pass filters and amplifiers 262 and 264 clear up low frequency noise and high frequency noise thereby enabling useful signals pass therethrough in an amplified form. The high voltage 265 is loaded on the APD 261 and the Ref APD 263 as a pull-up voltage on the output signals of the two diodes.

The coupling portion 24 comprises a coupler 241 and a power amplifier 242. The coupler 241 connects with the APD 261 and the Ref APD 263, and connects to the CPLD 222 through the amplifier 242. An oscillating signal from the CPLD 222 is coupled with an output signal from the APD 261 and a reference output signal from the Ref APD 263 through the coupler 241, so that the signal-processing portion 22 can calculate the time that the laser beams takes during the journey from the LD 252 to the target object and then back to the APD 261.

The inclination-measuring portion 23 has a construction substantially the same as the known inclinometer disclosed in the previously discussed U.S. patent application Ser. No. 10/813,065. The inclination-measuring portion 23 connects with the signal-processing portion 22, and detects an inclination angle that the laser beam emitted from the LD 252 deflects from the horizontal.

The signal-processing portion 22 comprises a Digital Signal Processor (DSP) 221, a voltage controlled oscillator (VCXD) 223, and the CPLD 222. The DSP 221 has a processing unit 2210 and the converter 2211. The converter 2211 receives an analog signal from the laser-receiving portion 26 and the inclination-measuring portion 23, and then converts the analog signal into a digital signal. The processing unit 2210 processes the digital signal and sends the result of processing to the display 21. The CPLD 222 is composed of a frequency synthesizer 2221 and a pair of switches 2220 and 2222. The frequency synthesizer 2221 and the switches 2220 and 2222 respectively connect with the processing unit 2210, and are controlled by the processing unit 2210. The VCXD 223 connects with and provides an oscillating signal for the frequency synthesizer 2221.

The display 21 connects with the DSP 221, and receives and displays the result from the DSP 221. The display 21 may be a liquid crystal display, or a display made from light emitting diodes.

In operation, the processing unit 2210 controls the statuses of the two switches 2220 and 2222, and controls the VCXD 223 to generate the oscillating signal through the frequency synthesizer 2221. The oscillating signal controls the LD driver 251 to drive the LD 252 for emission of a laser beam. A component or portion of the laser beam is directly received by the Ref APD 263 as a reference output signal, and the remaining portion of the laser beam is directed toward the target object and is then received by the APD 261 after being reflected by the target object as an output signal. The reference output signal and the output signal are then coupled with the oscillating signal, and are sent to converter 2211 through the band-pass filters and amplifiers 262 and 264. The inclination angle that the laser beam deflects from the horizontal is detected by the inclination-measuring portion 23, and is also sent to the converter 2211. The processing unit 2210 processes the signals after being converted by the converter 2211, calculates the distance, and sends the result to the display 21.

Figure 3A:
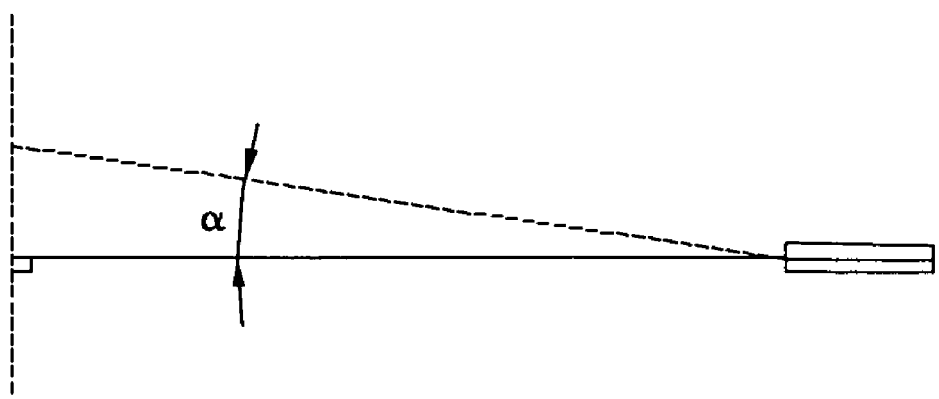
FIG. 3a is a pictorial view illustrating measurement of a horizontal distance by the laser distance-measuring device of the present invention.

Referring to FIG. 3a, which illustrates the measurement of a horizontal distance, with a measured distance (denoted by dashed line) and a sensed inclination angle α, both being detected with the device of the present invention, the horizontal distance can be readily calculated with Pythagorean theorem. In other words, the distance-measuring device of the present invention works out the horizontal distance, which is denoted by the solid line in FIG. 3a, by detecting the straight-line distance between the device and the target, which is denoted by the dashed line, and the inclination angle α.

Figure 3B:
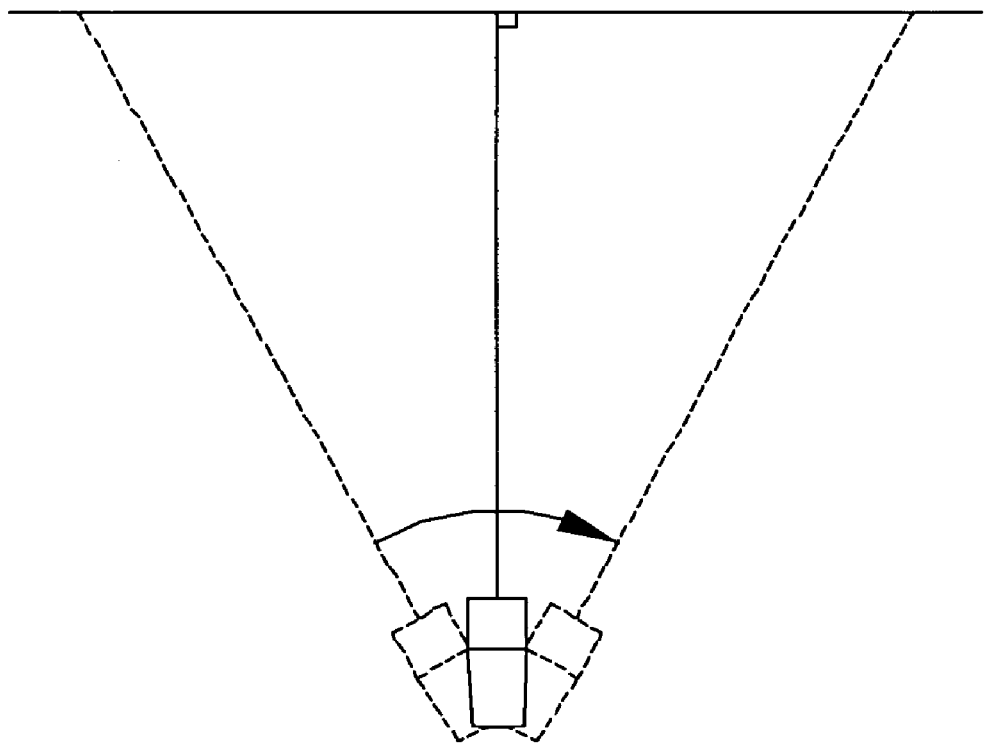
FIG. 3b is a pictorial view illustrating detection and measurement of a shortest distance by the laser distance-measuring device of the present invention.

Referring to FIG. 3b, which illustrates the detection of the shortest distance between the device and the target object, the distance-measuring device repeatedly detects the distance between the device and different points on the target object (as denoted by dashed lines) by moving the laser beam along the target object. The distances associated with different points on the target object are recorded and compared to find out the shortest one, which is denoted by solid line in FIG. 3b. The shortest distance may then be shown on the display 21.

Figure 3C:
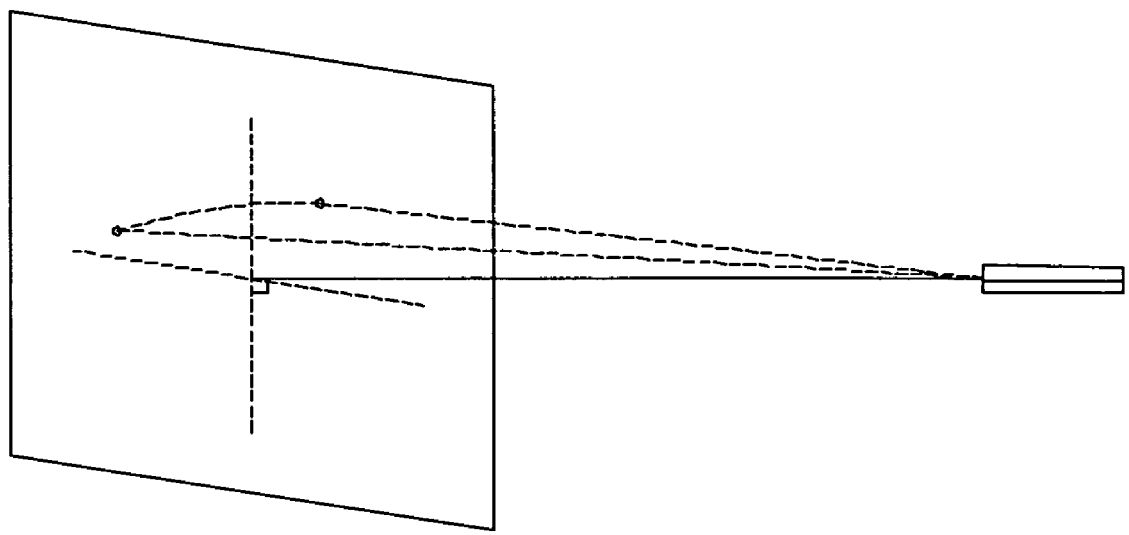
FIG. 3c is a pictorial view illustrating measurement of a perpendicular distance by the laser distance-measuring device of the present invention.

Referring to FIG. 3c, which illustrates the detection of a perpendicular distance from the distance-measuring device to a target vertical wall, the laser beam is randomly moved along the target vertical wall, and the shortest distance is determined. Based on the shortest distance and the inclination angle, the distance-measuring device can work out the perpendicular distance from the device to target vertical wall.

Figure 3D:
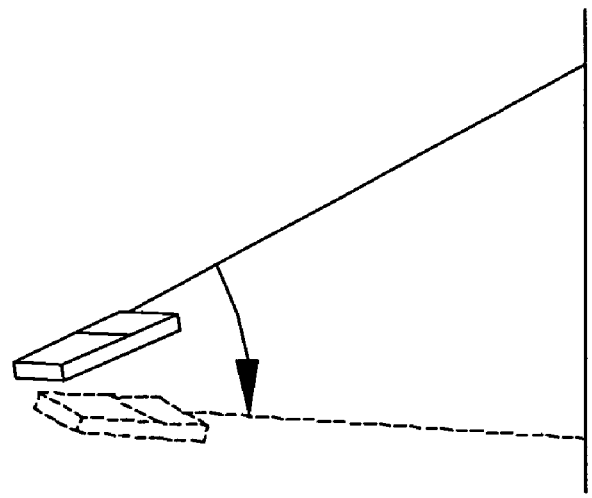
FIG. 3d is a pictorial view illustrating measurement a vertical distance between two points by the laser distance-measuring device of the present invention.
Figure 4:
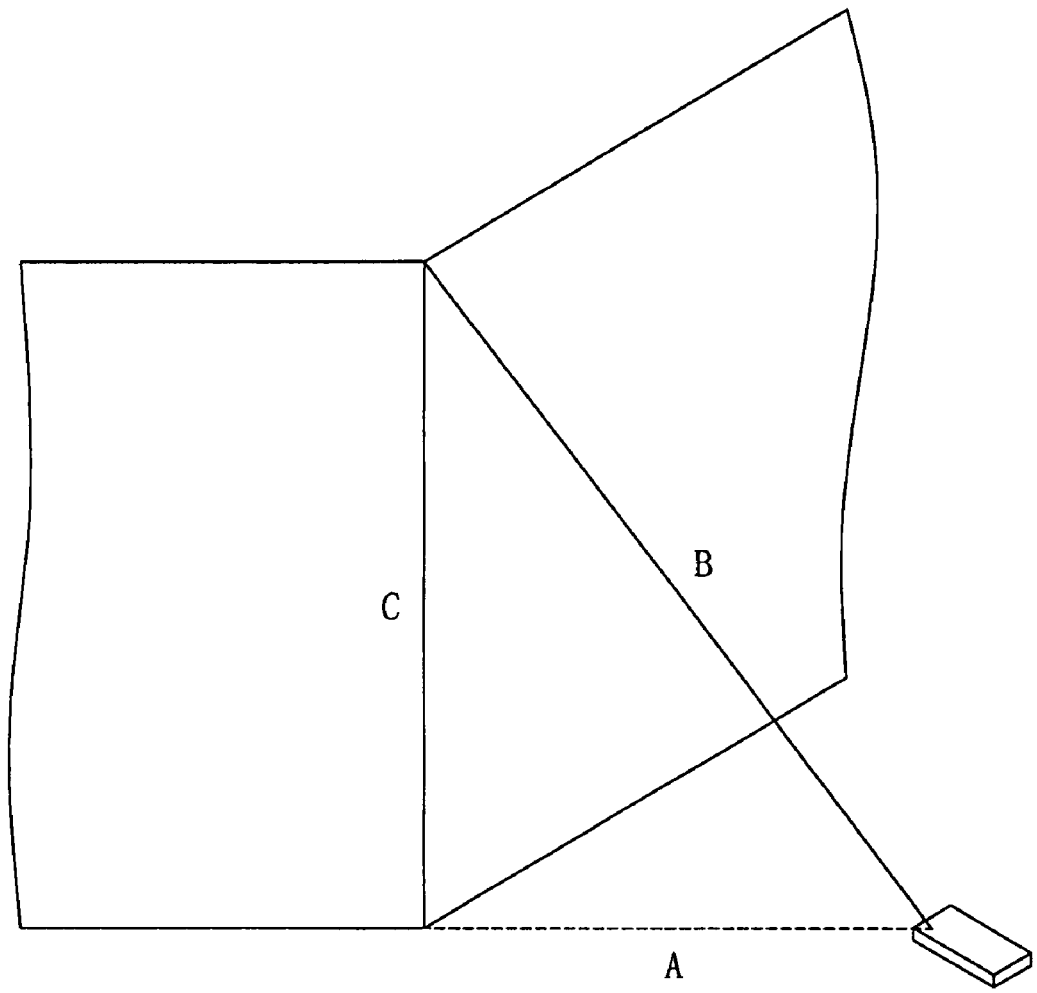
FIG. 4 is a pictorial view illustrating a conventional laser distance-measuring device measuring a height.

Referring to FIG. 3d, which illustrates the detection of a height of a target object, by measuring the distances to upper and lower ends of the height to be detected, together with the inclination angles detected, the height of the target object can be worked out.

It will be understood that the invention may be embodied in other specific forms without departing from the spirit or central characteristics thereof. The present examples and embodiments, therefore, are to be considered in all respects as illustrative and not restrictive, and the invention is not be limited to the details given herein.

What is claimed is:

1. A laser distance-measuring device, comprising:
   a laser-transmitting portion emitting a measuring laser beam adapted to impinge a target;
   a laser-receiving portion receiving a laser beam reflected from the target;
   an inclination-measuring portion detecting an inclination angle that the measuring laser beam deflects from the horizontal line; and
   a signal-processing portion electrically coupling with and receiving and processing signals from the laser-transmitting portion, the laser-receiving portion, and the inclination-measuring portion;
   wherein, the distance between the target and the laser distance-measuring device or the height of the target is caculated by the signal-processing portion by taking the detected inclination angle of the measuring laser beam as a primary parameter.

2. The laser distance-measuring device as claimed in claim 1, wherein the laser-transmitting portion comprises a laser diode driven by a laser diode driver.

3. The laser distance-measuring device as claimed in claim 1, further comprising a display, the display connecting with the signal-processing portion to receive and display signals generated by the signal-processing portion.

4. The laser distance-measuring device as claimed in claim 1, wherein the laser-receiving portion comprises an avalanche photo diode, which receives the laser beam reflected by the target as an output signal, and a reference avalanche photo diode, which receives the laser beam directly from the laser-transmitting portion as a reference output signal.

5. The laser distance-measuring device as claimed in claim 4, wherein the output signal and the reference output signal are sent to the signal-processing portion.

6. The laser distance-measuring device as claimed in claim 5 further comprising a coupling portion interconnecting the laser-receiving portion and the signal-processing portion, an oscillating signal generated from the signal-processing portion being coupled with the output signal and the reference output signal.

7. The laser distance-measuring device as claimed in claim 6, wherein the signal-processing portion comprises a DSP for processing the output signal and the reference output signal and a voltage controlled oscillator that generates the oscillating signal.

8. A laser distance-measuring device, comprising:
   a laser-transmitting portion emitting a measuring laser beam adapted to impinge a target;
   a laser-receiving portion receiving a reference laser beam and a reflected laser beam from the target, which are respectively converted into a reference output signal and an output signal;
   an inclination-measuring portion detecting an inclination angle that the measuring laser beam deflects from the horizontal line; and
   a signal-processing portion receiving and processing the reference output signal, the output signal, and the inclination angle;
   wherein, the distance between the target and the laser distance-measuring device or the height of the target is caculated by the signal-processing portion by taking the detected inclination angle of the measuring laser beam as a primary parameter.

9. The laser distance-measuring device as claimed in claim 8, further comprising a display for displaying the signals processed by the signal-processing portion.

10. The laser distance-measuring device as claimed in claim 8, wherein the laser-receiving portion comprises an avalanche photo diode that receives the reflected laser beam from the target as an output signal and a reference avalanche photo diode that receives the reference laser beam directly from the laser-transmitting portion as a reference output signal.

11. The laser distance-measuring device as claimed in claim 10, wherein an oscillating signal generated from the signal-processing portion is coupled with the output signal and the reference output signal.

12. The laser distance-measuring device as claimed in claim 11, wherein the signal-processing portion comprises a DSP that processes the output signal and the reference output signal and a voltage controlled oscillator that generates the oscillating signal.

* * * * *